INVENTOR.
James B. O'Maley
John W. Barnes
BY
Ostrolenk and Faber
ATTORNEYS

Aug. 23, 1960   J. B. O'MALEY ET AL   2,950,395
TRACKING DEVICE
Filed Feb. 16, 1954   2 Sheets-Sheet 2

INVENTORS
JAMES B. O'MALEY
JOHN W. BARNES
BY
Ostrolenk and Faber
ATTORNEYS

United States Patent Office 2,950,395
Patented Aug. 23, 1960

2,950,395

TRACKING DEVICE

James B. O'Maley, Seaford, and John W. Barnes, Floral Park, N.Y., assignors to Kollsman Instrument Corporation, Elmhurst, N.Y., a corporation of New York Filed Feb. 16, 1954, Ser. No. 410,631

14 Claims. (Cl. 250—203)

The present invention relates in general to apparatus for automatically tracking a target and more particularly to a tracking device adapted to respond precisely and continuously to deviations in its relative orientation with respect to the target so as to provide an indication of the direction of the target; as for example, determining the projectile miss distance in a gunnery trainer device.

In one use of our novel tracking device, a gunnery trainer is positioned at the center of a hemispherical screen; images of moving targets are projected on the screen and at the same time a dark or bright spot is projected for each target image displaced from the target (or the target may provide sufficient contrast with the background to obviate the need for the additional displaced spot). The tracker is mounted on the gun carriage so that when the gun is first roughly aligned with the target, the spot or target appears within the field of view of the tracker. The tracking device may then be used to score the gunner with respect to the number of times and duration "on target," the number of hits and misses, the number of times on target when not firing and the radial miss distance in both angle and magnitude.

Our tracker is adapted for use, because of a memory circuit, to images which are regularly intermittent and is thus adapted primarily to track images projected by motion picture apparatus although it may be used in fire control equipment to track images interrupted by propeller blades, shutters, protective devices and in any other locations where the tracked image may have an intermittent optical character.

Thus, for instance, my present invention may be applicable to a star tracker for navigational purposes which must operate through the rotor of a helicopter.

My invention is therefore directed to a novel memory circuit which will enable positioning servo mechanism or other operating devices to function substantially as if the data were not intermittent.

For general background information and for examples of prior techniques in this art, reference is made to the star trackers disclosed in patent application Serial Nos. 321,218, filed November 18, 1952, and 321,696, filed November 20, 1952, now Patent No. 2,905,828, September 22, 1959.

For purposes of the present application, it will be sufficient to note that a target tracker of this nature consists basically of a gimbaled telescope having a preselected field of view. The telescope (after an initial coarse orientation) transmits an optical image of the reference target into control apparatus which electromechanically establishes and maintains the contrasting target exactly on the longitudinal axis of the optical system; in other words, centered within the field of view. Where used in navigational equipment, the relative motion of the optical system during automatic tracking as required to maintain an axial "sight" on the target are translated into corresponding movements of location indicia, or into motion of operating or adjusting members.

A target tracker is fundamentally a servo-controlled telescope. The image formed by the telescope is translated into electrical data by a scanning mechanism in conjunction with a photo-electric cell, usually a photomultiplier for maximum sensitivity, and this data is then electronically analyzed for the generation of suitable correctional signals for servo operation.

Two dimensional correction information must be available from the servo for adjustment of the optical axis of the tracker telescope. Various specific arrangements have been disclosed in the above-referenced patent applications for developing the data signals representative of the instantaneous elevational and azimuthal deviation of the optical axis of the telescope from predetermined reference indicia.

One such system, which will be considered herein, utilizes a high speed rotating shutter for rapidly modulating (or chopping) the target image projected upon the photo-electric cell. If, by way of example, the optical image consists solely of a single point on a contrasting background, the shutter mechanism consisting of a semicircular opaque disc rotating within the field, will cause the photo-electric device to generate an electrical signal which is essentially a square wave whose frequency in cycles per second is related to the speed of the shutter. By appropriate shutter design (and numerous embodiments have been fully illustrated in the preceding applications), the electrical signal generated in the photoelectric cell output circuit will be characterized by an amplitude and phase instantaneously proportional to the elevational and azimuthal deviations respectively of the optical axis from the target being tracked. In order that the phase information be of significance, some absolute reference must be initially established. By way of illustration, the shutter may be driven by an alternating current synchronous self-orienting motor, and the same alternating current source used as a basis for comparison with the signal developed at the photo-electric cell output.

In one specific embodiment of a target tracker, the light incident upon the photo-electric cell is not only modulated by a rotating shutter whose effect is to yield the phase and amplitude modulation noted above, but is also wholly interrupted at a periodic rate relatively low to the shutter frequency. This interruption introduces the problem that the position data signal available to the input of the servo control system is discontinuous.

The present invention contemplates and has as a primary object the provision of means within a tracker control for accepting the discontinuous electrical signals generated by the shutter and interrupter mechanisms associated with the tracking telescope and photo-electric cell and yielding accurate and continuous data for energization of the servo orientation system. By virtue of the translation from low frequency discontinuous data to continuous data, many difficulties otherwise encountered in servo mechanism control are wholly avoided and system stability and dependability are materially improved.

In one aspect of the present invention, the control circuit which, in response to electrical signals generated by the photo-electric device, appropriately operates the orienting motors and mechanical linkages adjusting the telescope optical axis, is arranged effectively to introduce a substantial degree of continuity to low frequency data initially received in discontinuous fashion. After correction, insofar as the servo-mechanism is concerned, the data reintroduced in all respects the same as that eliminated by the periodic low frequency interruption of the target image. To achieve this result, the incoming discontinuous information is applied to two substantially parallel channels. One of these channels, terminating in a power amplifier, is arranged to yield a phase-synchronized square wave at the low frequency at which the light received by the telescope is interrupted. In the other signal channel, the phase and amplitude modulated data signal is intermittently applied to an amplifier through a vibrator arm synchronously driven from the power amplifier which terminates the first-mentioned signal channel. In one position of the vibrator arm, which corresponds to the portion of the cycle when light is "on" the servo amplifiers receive the amplified photo-electric cell output directly. In the alternate vibrator arm position, which occurs substantially in synchronism with the occultation of the light received by the telescope, a novel resonant energy storage circuit fills in the signal for servo amplifier energization. By establishing coincidence of energy storage circuit resonant frequency and shutter light modulation or carrier frequency, uninterrupted servo operation and control is assured. Other switching means may be used including a synchronous rectifier.

Another means of achieving the same result is by demodulating the incoming signal and synchronously switching a condenser as the storage element for the demodulated signal data; the demodulated position data thus obtained may then be remodulated onto a suitable carrier for operation of the A.C. servo motors. In this case, one phase sensitive detector with the appropriate reference signal would be required for each control axis i.e., one for azimuth and one for elevation control.

Therefore, an object of this invention is to provide a novel high frequency resonant energy storage circuit for smoothing discontinuous servo input signals.

Another object of the present invention is to provide means for synchronizing the application of stored energy to a servo control system with the periodic interruption of the input data.

A further object of the present invention is to provide means for controlling the application of stored relatively high frequency data intrinsic in a periodic and intermittent signal by a vibrator or other switching means, synchronously operated from the relatively low frequency component of the signal.

These and other objects of the present invention will now become apparent from a consideration of the following specification taken in connection with the accompanying drawing in which.

Figure 1:
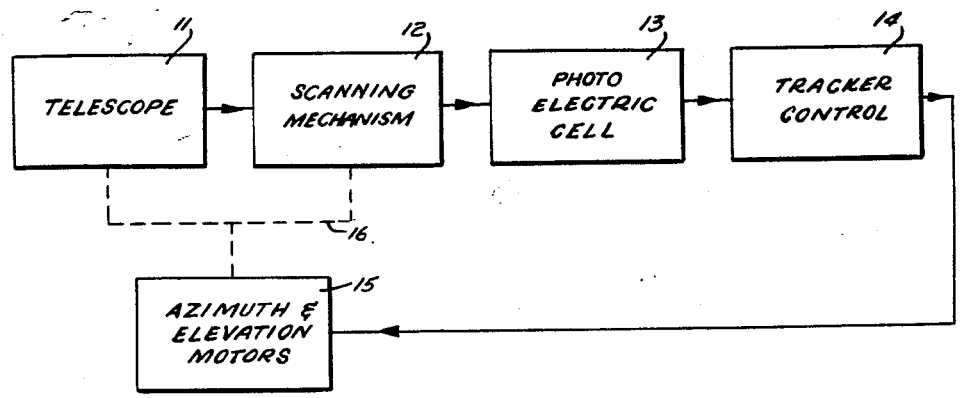
Figure 1 is a block diagram which indicates the arrangement of key components in a tracker.

With reference now to the drawing, and more specifically to Figure 1, there is illustrated in block form the logical interconnection of the major components involved in a system for tracking a contrasting target. Basically, the tracker includes a telescope 11 which may be focused upon the target to be followed, and is designed optically to provide a predetermined angular field of view. The relative extent of the field encompassed will be dictated by the specific application of the system. The optical image established by the telescope 11 is projected through a scanning mechanism 12 upon a photo-electric cell 13. The tracker control circuit 14, in response to signals received from the photo-electric cell 13, develops correctional electric signals which are, in turn, applied to azimuth and elevation control motors 15. By a mechanical linkage, diagrammatically depicted by the broken line 16, these control motors are used to determine the relative motion of the telescope 11 and the associated scanning mechanism 12 in retaining a sight on the tracked target.

It may be observed that the over-all tracker illustrated in Figure 1 is essentially a closed loop combining electrical and mechanical features. The precise configuration of the telescope 11, scanning mechanism 12 and photo-electric cell 13 will not be disclosed in the present application, since the basic electromechanical characteristics required therefor have already been fully disclosed in the above-identified patent applications, and further, because their specific designs are not in and of themselves features of the present invention.

Let us assume that the image of any target in the field of telescope 11 is modulated at 400 cycles per second by a synchronously driven rotary shutter and that the light received by the telescope is interrupted by some external means.

The effect of this modulating arrangement is to provide, at the photo-electric cell 13, a signal which contains two-dimensional information related to the instantaneous deviation of the longitudinal axis of the telescope 11 from the target tracked, in an intermittent form. Thus, the signal amplitude during the "on" period is a function of the radial distance of the target image from the optical center of the telescope field of view, while the phase represents the angular position of the image about a reference radius.

Figure 2A:
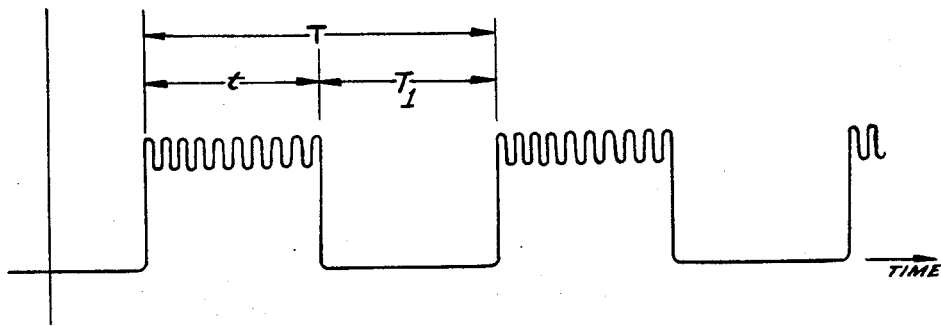
Figures 2A and 2B are graphical illustrations of various signal wave forms which are available in the apparatus generally indicated in Figure 1.

Figure 2A presents a graphical representation of the image as it is applied to the photo-electric cell 13, and by virtue of the linear translation available, may additionally be considered to be an illustration of the potential waveform generated in the output of the photo-electric cell circuit.

For the specific modulation and interruption frequencies under consideration, the interval T represents $\frac{1}{48}$ second while the half periods $t$ and $t_1$ each cover an interval of $\frac{1}{96}$ second. During the time $t$, the 400 cycle light modulation falls upon the photo-electric cell while during the period $t_1$, the received light is occulted and thus the photocell signal is wholly absent. In the discussion which follows, intervals $t$ and $t_1$ will be referred to more appropriately as the light-on and light-off intervals.

Returning to Figure 1, it is the function of the tracker control 14 to accept electrical signals having the general waveform illustrated in Figure 2A and to extract therefrom signals which continuously represent the azimuthal and elevational deviations of the telescope, for application to the respective restoring motors 15. Before entering into a full discussion of the tracker control, it would be well to indicate that synchronous relationships are set throughout, in that the self orienting shutter motor (not shown) in scanning mechanism 12, and the azimuth and elevation restoring motors 15, are all driven from a common alternating current power source. Unique phase synchronization is essential to reliable system performance.

Figure 3:
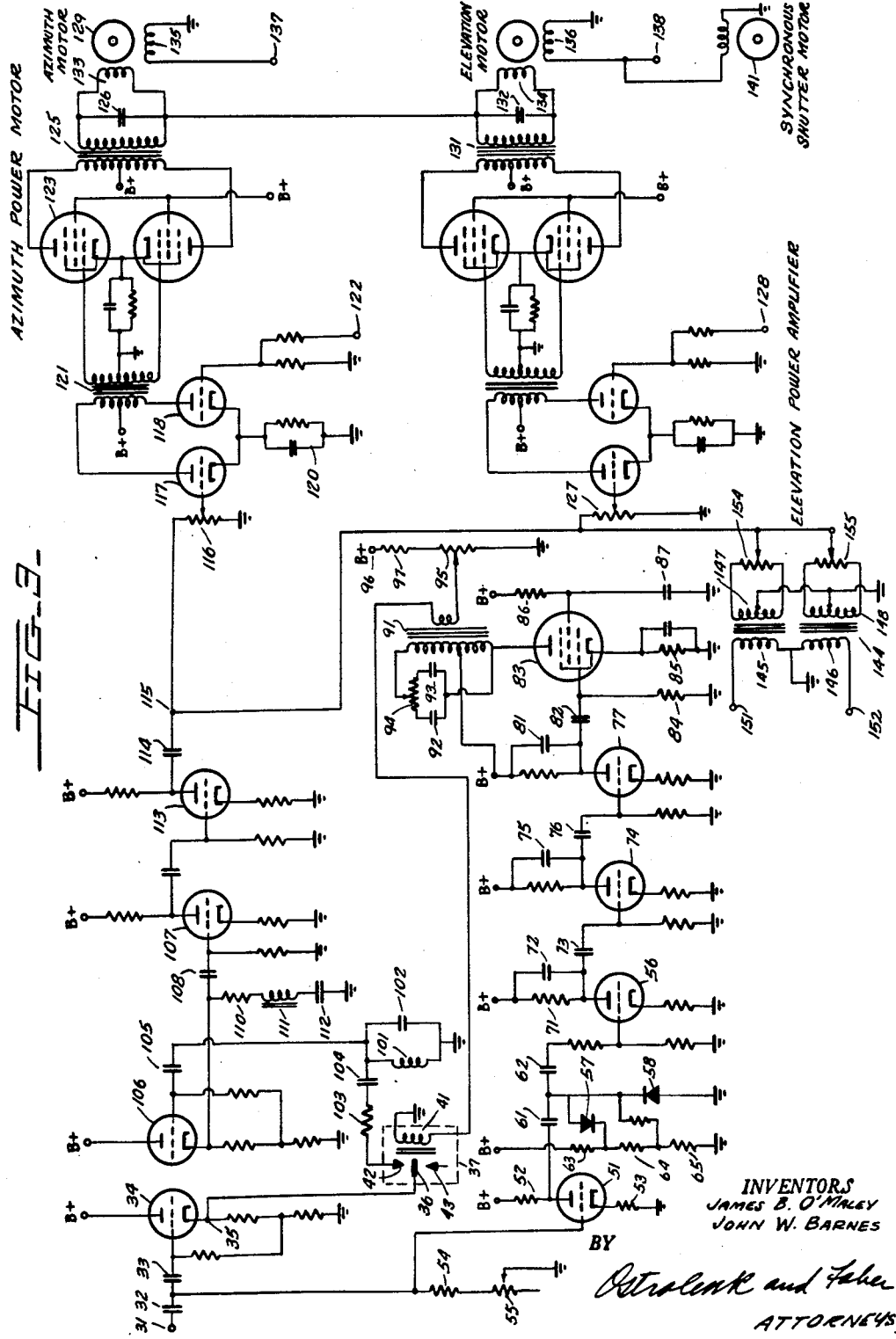
Figure 3 is a detailed schematic circuit diagram of the control system utilized in the present invention.

With reference now to the schematic circuit diagram of Figure 3, the features and operation of the tracker control will now be discussed in detail. The output of the photo-electric cell unit hereinabove discussed is applied at tracker control input terminal 31 where it is coupled through capacitor 32 to the inputs of two channels which are effectively in parallel. The first of these channels which appears in the upper portion of the drawing will be considered the signal channel while the circuit in the lower portion of the drawing will be termed the driver channel.

Considering the signal channel first, the input signal is applied through capacitor 33 to the control grid of a cathode follower formed of electron tube triode 34. This input cathode follower provides, at its cathode circuit output junction 35, a low impedance signal for application to the vibrating arm 36 of an electromechanical vibrator, or chopper 37.

Chopper 37 consists essentially of a driver winding 41 and a pair of contacts 42 and 43 associated with and intermediate to the vibrating arm 36. To indicate the manner in which power is obtained for operation of winding 41 of chopper 37, the driver channel noted earlier will now be discussed.

Thus, the signal appearing at the junction between capacitors 32 and 33 is applied to the control grid of a triode electron tube 51, the plate of which is returned to positive power source B+ through load resistor 52, while its cathode is connected to ground through an unbypassed resistor 53. The grid of triode 51 is grounded through the series arrangement of fixed resistor 54 and variable resistor 55, the function of which will be discussed later.

The output of triode 51, as taken from the plate thereof, is connected to the control grid of triode amplifier 56 through a clipping circuit which is formed of oppositely poled crystal diode rectifiers 57 and 58 extending from the junction of coupling capacitors 61 and 62. The clipping circuit removes the 400 c.p.s. component of the signal. Positive biases are applied to the diodes by means of a simple resistance voltage divider consisting of resistors 63, 64 and 65, all in series between B+ and ground. With particular reference to triode 56, it will be observed that the plate road resistor 71 is shunted by capacitor 72 whose function is to partially phase correct the 48 cycle signal for proper phasing of the chopper.

Through capacitor 73, the output of tube 56 is applied to the input of amplifier tube 74, the design of which is essentially similar to the circuit of tube 56. Thus, capacitor 75 provides additional phase correction. Capacitor 76 is used to couple the output of tube 74 to a third identical stage utilizing electron tube triode 77. Here again, a plate shunting capacitor 81 is used to provide a signal having approximately the proper phase after amplification in amplifiers 56, 74 and 77, the filtered 48 cycle signal, is applied through capacitor 82 to the control grid of a power pentode 83, which utilizes grid resistor 84, cathode bias circuit 85 and the screen potential circuit, resistor 86 and capacitor 87.

The plate circuit of power amplifier 83 includes the primary winding of transformer 91. Note that the center tap of the primary thereof is driven from the positive power source B+, while the opposed ends of this winding are connected to a phase-adjusting circuit consisting of capacitors 92 and 93 joined by the ends of a potentiometer 94. An end of the secondary winding of transformer 91 is joined to the chopper winding 41 while the other end is returned to the tap of potentiometer 95 connected between ground and positive terminal 96, through fixed resistor 97.

Certain features of the driver channel as energized from input terminal 31 may now be considered. The basic functions of the driver channel are to phase correct and to amplify the 48 cycle component of the input signal to a level sufficient to drive the chopper winding 41. Potentiometer 55 controls the wave shape of the signal applied to tube 51. Specifically, its function is to permit adjustment so that during the light-on portion of the signal, a fairly flat-topped wave is obtained for further amplification.

The 48 cycle wave applied to winding 41 is superimposed upon a positive D.-C. bias picked off at potentiometer 95. By applying an adjustable static current to winding 41 in this manner, a polarizing magnetic field is attained therein, as a result of which the length of time per cycle that the vibrating arm 36 engages contact 42 may be accurately controlled.

Potentiometer 94 functions as a fine adjustment to control the phase of vibrator arm motion in the chopper with respect to signals applied thereto.

Returning to the signal channel, described to some extent above, it will be observed that contact 42 is connected to a high-Q parallel resonant circuit, formed of low-loss inductor 101 and capacitor 102, through the series combination of resistor 103 and capacitor 104. Resonant circuit 101—102 is connected through capacitor 105, to the control grid of a triode cathode follower 106 of conventional design. The output of stage 106 is taken from the tube cathode and applied to the control grid of triode 107 through coupling capacitor 108. Shunting the output circuit of cathode follower 106 is an error rate network consisting of inductor 111 and capacitor 112 and a resistor 110. The output of the latter tube taken through coupling capacitor 114 and applied to the azimuth and elevation power amplifiers which drive the positioning motors.

In Figure 2A, it was shown that the signal appearing at terminal 31 consisted of equal intervals representing light-on and light-off, the interruption frequency being 48 cycles per second. By appropriate adjustment of potentiometers 94 and 95, vibrating arm 36 is arranged to engage contact 42 solely during the light-on interval of the input waveform and to be disengaged therefrom during the light-off fraction of the waveform.

Figure 2B:
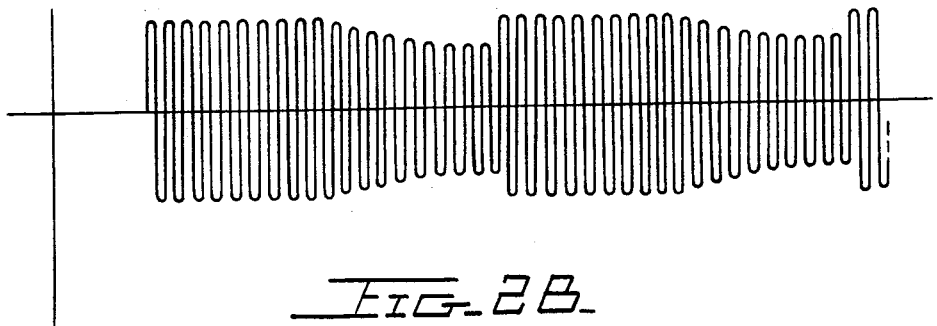

The resonant circuit formed of inductor 101 and capacitor 102 is tuned to the 400 cycle input signal component, and during the light-on period, the signal from junction 35 at the output of cathode follower 34 is fed directly to this resonant circuit for further transfer to the parallel input of cathode follower 106. During the light-off period, disengagement of vibrating arm 36 from contact 42 frees the resonant circuit 101—102 from the input source to dissipate some of its stored 400 cycle energy as a slightly damped oscillatory signal. Consequently, in the light-off interval, so far as tube 106 is concerned, the signal input is of the same frequency but of slightly decaying amplitude. The signal waveform as it appears across the resonant storage circuit 101—102 is shown in Figure 2B. Absolute synchronism of the vibrating arm 36 is maintained with the signal input, since the arm is driven from the 48 cycle component of the input through the driver channel which terminates in output transformer 91. The resonant circuit 101—102, by feeding into a cathode follower, drives an exceptionally high impedance, and accordingly, during light-off periods, there is relatively little decay other than that encountered due to the internal resistive losses of the resonant elements themselves. Although the output of cathode follower 34 represents a comparatively low impedance, this impedance only shunts the resonant circuit 101—102 during the application of 400 cycle signal during light-on period and is wholly disconnected therefrom during the light-off period by chopper action.

Series capacitor 104 is charged to the peak value of the 48 cycle square wave of the interrupted input signal during the light-on period when arm 36 engages contact 42. During the light-off period, capacitor 104 is disconnected from the low impedance input circuit and cannot alter its charge (and consequently, its potential). By virtue of this action, capacitor 104 effectively eliminates the 48 cycle component of the input signal, applied from junction 35, across the resonant circuit 101—102. The 400 cycle signal, however, freely passes through capacitor 104 to the resonant circuit during the light-on period.

It will thus be evident that a discontinuous signal applied at terminal 31, made up of a 400 cycle signal interrupted at 48 cycles per second is, by virtue of the circuit arrangement shown, smoothed to a continuous and substantially constant amplitude 400 cycle signal bearing the necessary phase and amplitude information.

To indicate the manner in which the signal output of amplifier 113 as received at junction 115 is utilized in the tracker, the azimuth and elevation power amplifiers associated with the telescope, as discussed in Figure 1, have been presented in detail. Referring specifically to Figure 3, the data signal at junction 115 is applied through gain-control potentiometer 116 to twin triode amplifier 117 and 118. The common cathodes are returned to ground through a conventional bias circuit 120 and the plates are connected to the opposite ends of the primary of coupling transformer 121. A center tap on the primary is used for the application of power from the positive source B+. The control grid of triode 118 is energized from terminal 122 with a signal derived from a tachometer (not shown) in the tracker telescope azimuth drive mechanism. This signal serves for viscous damping of the operation of the azimuth control amplifier. The secondary of transformer 121 drives a conventional push-pull power amplifier using pentode electron tubes 123 and 124, and the output of these tubes is taken through the secondary of transformer 125 shunted by phase-correcting capacitor 126.

The elevation power amplifier circuit, extending from elevation gain control potentiometer 127, is in all respects identical to the azimuth amplifier just previously discussed, with the exception that, the viscous damping potential is applied at terminal 128 is derived from a tachometer (not shown) in the telescope elevation electromechanical system. The output of the elevation power amplifier is taken at the secondary of output transformer 131 as shunted by phase-correcting capacitor 132.

Associated with the azimuth and elevation power amplifiers are the azimuth and elevation two-phase, 400 cycle synchronous induction motors 129 and 130, respectively. Winding 133 in the azimuth motor is directly energized from the output of push-pull transformer 125 while winding 134 of the elevation motor is similarly actuated from transformer 131 in the elevation power amplifier. By virtue of the similarity between the azimuth and elevation amplifier systems and further, since these amplifiers are energized in parallel from junction 115, windings 133 and 134 receive essentially the same 400 cycle signal. (Note that the gains of these channels are independently adjustable.)

The two-dimensional significance of the data inherent in the similar signals applied to windings 133 and 134 is realized by energizing second windings 135 and 136 on the azimuth and elevation motors, respectively, from 400 cycle power sources at terminals 137 and 138, which though identical in frequency and amplitude, are displaced 90° in phase. In other words, that component of the 400 cycle signal (first intermittently applied at terminal 31, and appearing in continuous form at junction 115) which on application to winding 133 is in the appropriate phase with respect to the 400 cycle signal applied at terminal 137, causes operation of the azimuth motor. Correspondingly, the input signal component at 400 cycles which is, after amplification, impressed upon winding 134 in the appropriate phase with respect to the quadrature power signal applied at terminal 138, drives elevation motor 130 to restore the telescope for zero deviation.

For purposes of illustrating the unique phase relationships which must necessarily be maintained for satisfactory operation, a synchronous self-orienting motor 141 has been depicted as energized from terminal 138, for operation of the light modulating shutter in the scanner discussed in connection with Figure 1. Motor 141 is initially positioned to give signal of the proper phase to drive the azimuth and elevation motors in response to azimuth and elevation deviations respectively.

Transformer 144, having a pair of primary windings 145 and 146 and associated secondary windings 147 and 148, is energized at terminals 151 and 152 from a 400-cycle, two-phase, alternating current supply. In fact, terminals 151 and 152 may be energized from the power sources previously mentioned as connected to terminals 137 and 138.

The secondaries 147 and 148 of transformer 144 are shunted by potentiometer 154 and 155, respectively. The center taps of the secondary windings are grounded and the adjustable taps on both potentiometers 154 and 155 are connected in parallel and directly coupled to junction 115 from which the azimuth and elevation gain potentiometers 116 and 127 are energized. Evidently, when the adjustable taps on both potentiometers 154 and 155 are directly centered, no potentials are applied to junction 115 through transformer 144. However, by the displacement of either potentiometer tap from this midposition, a 400 cycle signal of adjustable magnitude may be introduced to the azimuth and elevation power amplifiers. By virtue of the quadrature phase relationship of the signals available from potentiometers 154 and 155, the introduction of a signal from one will affect only the azimuth motor while a signal from the other will affect only the elevation motor. By appropriate adjustment of these potentiometer taps, it is possible to cancel effectively any displacement error which would otherwise be caused by fixed illuminating gradients in the field of the telescope. If an illumination gradient does exist along any diameter of the field of view, appropriate adjustment of taps of the potentiometers 154 and 155 may be used to cancel any erroneous signals which would otherwise be developed and applied to the photo-electric cell as discussed in connection with Figure 1.

Apparatus of the type generally illustrated in the drawings has been tested at the operating frequencies disclosed herein. In summary, it has been found that tracking rates as great as thirty degrees per second at either high or low acceleration rates were realizable with a dynamic aiming error of less than three to five minutes of arc. Throughout such tests, the magnitude of the light output of the telescope mechanism was varied over an extreme range without appreciable deterioration in performance.

As has already been observed, the frequencies discussed by way of example herein are in no way limiting although they have been found to provide optimum performance characteristics in the apparatus illustrated. Both frequencies specified could be readily varied over relatively wide ranges as required simply by adjustment of the power source frequency together with the frequencies of the resonant circuits essential to operation. In the discussion above, the low frequency interruption rate was periodic and equal intervals were allowed for the light-on and light-off period. However, performance of the system disclosed would not be adversely affected by alteration of this time division.

In view of the fact, therefore, that numerous modifications and departures may now be made by those skilled in this electrical art, the invention herein is to be construed as limited only by the spirit and scope of the appended claims.

What is claimed is:

1. Apparatus for continuously tracking a target the sighting of which is periodically interrupted comprising an adjustable tracking telescope, azimuth and elevation orienting motors mechanically coupled to said telescope for respectively adjusting the azimuth and elevation of the longitudinal axis thereof, photo-electric means associated with said telescope for generating A.C. electrical signals during the sighting periods having a relative phase displacement representative of the azimuthal and elevational deviation of said axis of said telescope from said target, a control circuit for yielding uninterrupted correctional signals to said motors, means for applying said electrical signals to said control circuit, and switching means in said control circuit operated synchronously from said periodic A.C. signals for generating a continuous A.C. signal at the same frequency and phase as that of the generated periodic A.C. signals for yielding substantially continuous electrical correctional data to said azimuth and elevation orienting motors, whereby continuous tracking of the apparatus is effected despite the sighting interruptions.

2. Apparatus for continuously tracking a target the sighting of which is periodically interrupted comprising an adjustable tracking telescope, azimuth and elevation orienting motors mechanically coupled to said telescope for respectively adjusting the azimuth and elevation of the longitudinal axis thereof, photo-electric means associated with said telescope for generating A.C. electrical signals during the sighting periods having a relative phase displacement representative of the azimuthal and elevational deviation of said axis of said telescope from said target, a control circuit including an electrical switch, means for applying said electrical signals to said control circuit, means in said control circuit for driving said switch at the interruption frequency of said electrical signals, and means associated with said switch and responsive to said electrical signals for generating a continuous A.C. signal at the same frequency and phase as that of the generated periodic A.C. signals for providing continuous correctional electrical signals for application to said azimuth and elevation orienting motors, whereby continuous tracking of the apparatus is effected despite the sighting interruptions.

3. Apparatus for continuously tracking a target the sighting of which is periodically interrupted comprising an adjustable tracking telescope, azimuth and elevation orienting motors mechanically coupled to said telescope for respectively adjusting the azimuth and elevation of the longitudinal axis thereof, photo-electric means associated with said telescope for generating A.C. electrical signals during the sighting periods having a relative phase displacement representative of the azimuthal and elevational deviation of said axis of said telescope from said target, a control circuit including an electrical switch and an energy storage circuit, means for applying said electrical signals to said control circuit, means in said control circuit responsive to said electrical signals for synchronously driving said electrical switch at the interruption frequency of said electrical signals and periodically energizing said energy storage means for generating a continuous A.C. signal at the same frequency and phase as that of the generated periodic A.C. signals whereby said control circuit provides continuous output electrical data, and means responsive to said continuous data for applying substantially continuous correctional signals to said azimuth and elevation orienting motors, whereby continuous tracking of the apparatus is effected despite the sighting interruptions.

4. Apparatus for continuously tracking a target the sighting of which is periodically interrupted comprising an adjustable tracking telescope, azimuth and elevation orienting motors mechanically coupled to said telescope for respectively adjusting the azimuth and elevation of the longitudinal axis thereof, a photo-electric cell, means interposed between said telescope and said photoelectric cell for modulating light received by said telescope from said target whereby said photo-electric cell generates A.C. electrical signals during the sighting periods having a relative phase displacement indicative of the azimuthal and elevational deviation of said axis of said telescope from said target, a control circuit including an electrical switch, means for applying said electrical signals for actuation of said electrical switch at the interruption frequency of said electrical signals, an energy storage network connected to said switch and arranged to receive said electrical signals only during uninterrupted periods thereof for generating a continuous A.C. signal at the same frequency and phase as that of the generated periodic A.C. signals, and amplifying means responsive to said continuous A.C. signal of said energy storage network for providing a substantially continuous output signal for application as correctional signals to said azimuth and elevation orienting motors, whereby continuous tracking of the apparatus is effected despite the sighting interruptions.

5. Apparatus for continuously tracking a target the sighting of which is periodically interrupted comprising an adjustable tracking telescope, azimuth and elevation orienting motors mechanically coupled to said telescope for respectively adjusting the azimuth and elevation of the longitudinal axis thereof, a photo-electric cell, means interposed between said telescope and said photo-electric cell for modulating the image received by said telescope from said target whereby said photo-electric cell generates electrical signals indicative of the azimuthal and elevational deviation of said axis of said telescope from said target, a control circuit including an electrical switch, means for amplifying said electrical signals, means for applying said amplified electrical signals for actuation of said electrical switch in synchronism with the sighting interruptions, a high Q resonant circuit electrically coupled to said electrical switch and arranged to receive energy through said coupling during predetermined intervals of said electrical signals, and means responsive to the signal appearing across said resonant circuit for deriving substantially continuous correctional signals for application to said azimuth and elevation orienting motors, whereby continuous tracking of the apparatus is effected despite the sighting interruptions.

6. Apparatus for continuously tracking a target the line of sight to which is continually interrupted comprising an adjustable tracking telescope, azimuth and elevation orienting motors mechanically coupled to said telescope for respectively adjusting the azimuth and elevation of the longitudinal axis thereof, a photo-electric cell, means interposed between said telescope and said photo-electric cell for modulating the image received by said telescope from said target whereby said photo-electric cell generates a discontinuous electrical signal characterized by high and low frequency components, a first amplifier for said discontinuous electrical signal, a magnetically driven electrical switch, means in said first amplifier coupling the signal therein through the contacts of said electrical switch, a second amplifier arranged to amplify solely the low frequency components of said discontinuous electrical signal, means for applying the output of said second amplifier for the actuation of said magnetically operated electrical switch, a high Q circuit resonant at the high frequency component of said discontinuous electrical signal in said first amplifier, and means in said second amplifier for controlling the phase of said electrical switch actuation signal.

7. Apparatus for continuously tracking a target the line of sight to which is continually interrupted comprising an adjustable tracking telescope, azimuth and elevation orienting motors mechanically coupled to said telescope for respectively adjusting the azimuth and elevation of the longitudinal axis thereof, photo-electric means associated with said telescope for generating a periodic discontinuous electrical signal representative of the azimuthal and elevational deviation of said axis of said telescope from said target, a control circuit including an electrical switch and an energy storage circuit, means for applying said periodic discontinuous electrical signal to said control circuit, a clipping circuit in said control circuit for removing the high frequency modulation of said discontinuous electrical signal, means in said control circuit responsive to the low frequency output of said clipping circuit for synchronously driving said electrical switch thereby periodically energizing said energy storage means, whereby said control circuit provides continuous output electrical data, and means responsive to said continuous data for applying substantially continuous correctional signals to said azimuth and elevation orienting motors.

8. Apparatus for continuously tracking a target the line of sight to which is continually interrupted comprising an adjustable tracking telescope, azimuth and elevation orienting motors mechanically coupled to said telescope for respectively adjusting the azimuth and elevation of the longitudinal axis thereof, a photo-electric cell adapted to receive light from said telescope, means interposed between said telescope and said photo-electric cell for modulating light received by said telescope from said target and arranged whereby said photo-electric cell generates a relatively high frequency electrical signal superimposed on a relatively low square wave, said photo-electric cell signal being indicative of the azimuthal and elevational deviation of said telescope axis from said target, an electrical switch having a magnetically driven vibrating arm and a fixed contact associated therewith, a first amplifier energized by said electrical signal output of said photo-electrical cell for synchronously driving said vibrating arm at said relatively low frequency of said square wave, a high Q circuit resonant at said relatively high frequency, a second amplifier responsive to the signal appearing across said resonant circuit, said electrical switch being arranged to apply said signal output of said photo-electric cell to said resonant circuit solely during intervals when said contact is engaged by said vibrating arm, and means responsive to the output of said second amplifier for deriving substantially continuous correctional signals for application to said azimuth and elevation orienting motors.

9. Apparatus for continuously tracking a target the line of sight to which is continually interrupted comprising an adjustable tracking telescope, azimuth and elevation orienting motors mechanically coupled to said telescope for respectively adjusting the azimuth and elevation of the longitudinal axis thereof, a photo-electric cell adapted to receive light from said telescope, means interposed between said telescope and said photo-electric cell for modulating light received by said telescope from said target and arranged whereby said photo-electric cell generates a relatively high frequency electrical signal superimposed on a relatively low frequency square wave, said photo-electric cell signal being indicative of the azimuthal and elevational deviation of said telescope axis from said target, an electrical switch having a magnetically driven vibrating arm and a fixed contact associated therewith, a first amplifier energized by said electrical signal output of said photo-electric cell for synchronously driving said vibrating arm at said relatively low frequency of said square wave, a high-Q circuit resonant at said relatively high frequency, a capacitor series connecting said resonant circuit to said contact, a second amplifier responsive to the signal appearing across said resonant circuit, said electrical switch being arranged to apply said signal output of said photo-electric cell to said resonant circuit through said series capacitor solely during intervals when said contact is engaged by said vibrating arm, and means responsive to the output of said second amplifier for deriving substantially continuous correctional signals for application to said azimuth and elevation orienting motors.

10. Apparatus for continuously tracking a target the line of sight to which is continually interrupted comprising an adjustable tracking telescope, azimuth and elevation orienting motors mechanically coupled to said telescope for respectively adjusting the azimuth and elevation of the longitudinal axis thereof, a photo-electric cell adapted to receive light from said telescope, means interposed between said telescope and said photo-electric cell for modulating light received by said telescope from said target and arranged whereby said photo-electric cell generates a relatively high frequency electrical signal, superimposed on a relatively low frequency square wave, said photo-electric cell signal being indicative of the azimuthal and elevational deviation of said telescope axis from said target, an electrical switch having a magnetically driven vibrating arm and a fixed contact associated therewith, a first amplifier energized by said electrical signal output of said photo-electric cell for synchronously driving said vibrating arm at said relatively low frequency of said square wave, a high-Q circuit resonant at said relatively high frequency, a capacitor series connecting said resonant circuit to said contact, a second amplifier responsive to the signal appearing across said resonant circuit, said electrical switch being arranged to apply said signal output of said photo-electric cell to said resonant circuit through said series capacitor solely during intervals when said contact is engaged by said vibrating arm, means for adjusting the phase of motion of said vibrating arm relative to the phase of the signal output of said photo-electric cell, and means responsive to the output of said second amplifier for deriving substantially continuous correctional signals for application to said azimuth and elevation orienting motors.

11. Apparatus for continuously tracking a target the line of sight to which is continually interrupted comprising an adjustable tracking telescope, azimuth and elevation orienting motors mechanically coupled to said telescope for respectively adjusting the azimuth and elevation of the longitudinal axis thereof, a photo-electric cell adapted to receive light from said telescope for modulating light received by said telescope from said target and arranged whereby said photo-electric cell generates a relatively high frequency electrical signal modulated by a relatively low frequency square wave, said photo-electric cell signal being indicative of the azimuthal and elevational deviation of said telescope axis from said target, an electrical switch having a magnetically driven vibrating arm and a fixed contact associated therewith, a first amplifier energized by said electrical signal output of said photo-electric cell for synchronously driving said vibrating arm at said relatively low frequency of said square wave, a high-Q circuit resonant at said relatively high frequency, a capacitor series connecting said resonant circuit to said contact, a second amplifier responsive to the signal appearing across said resonant circuit, said electrical switch being arranged to apply said signal output of said photo-electric cell to said resonant circuit through said series capacitor solely during intervals when said contact is engaged by said vibrating arm, means for adjusting the phase of motion of said vibrating arm relative to the phase of the signal output of said photo-electric cell, means for providing an adjustable static current to said electrical switch for controlling the interval of contact of said vibrating arm with said contact, and means responsive to the output of said second amplifier for deriving substantially continuous correctional signals for application to said azimuth and elevation orienting motors.

12. Apparatus for obtaining a continuous A.C. electrical output corresponding to a periodic A.C. electrical input comprising a control circuit including an energy storage circuit and an electrical switch, means for applying the periodic electrical signals of said input to said control circuit, means in said control circuit responsive to the periodic factor of the signals, electrical signals for synchronously driving said electrical switch and periodically energizing said energy storage circuit with the periodic A.C. signals and produce corresponding continuous A.C. signals at the same frequency and phase as that of the periodic A.C. electrical input signals whereby said control circuit provides continuous output electrical data.

13. Apparatus for obtaining a continuous A.C. electrical output corresponding to a periodic A.C. electrical input comprising a control circuit including an energy storage circuit and an electrical switch, means for applying the periodic electrical signals of said input to said control circuit, means for amplifying said periodic electrical signals, means for applying said amplified periodic electrical signals for actuation of said electrical switch in synchronism with the periodic factor of the signals, said energy storage circuit being connected to said switch and arranged to receive said periodic electrical signals only during predetermined periods thereof and produce corresponding continuous A.C. signals at the same frequency and phase as that of the periodic A.C. electrical input signals, and amplifying means responsive to the continuous signals of said energy storage circuit for providing the substantially continuous output A.C. signal.

14. Apparatus for continuously tracking a target the line of sight to which is continually interrupted comprising an adjustable tracking telescope, azimuth and elevation orienting motors mechanically coupled to said telescope for respectively adjusting the azimuth and elevation of the longitudinal axis thereof, a photo-electric cell, means interposed between said telescope and said photo-electric cell for modulating the image received by said telescope from said target whereby said photo-electric cell generates a discontinuous electrical signal characterized by high and low frequency components, a first amplifier for said discontinuous electrical signal, a synchronous rectifier, means in said first amplifier coupling the signal therein through the contacts of said synchronous rectifier, a second amplifier arranged to amplify solely the low frequency components of said discontinuous electrical signal, means for applying the output of said second amplifier for the actuation of said synchronous rectifier, a high-Q circuit resonant at the high frequency component of said discontinuous electrical signal in said first amplifier, and means in said second amplifier for controlling the phase of said synchronous rectifier actuation signal.

References Cited in the file of this patent

UNITED STATES PATENTS

| | | | |
|---|---|---|---|
| 2,495,704 | De Rosa | | Jan. 31, 1950 |
| 2,513,367 | Scott | | July 4, 1950 |
| 2,544,653 | Browder | | Mar. 13, 1951 |
| 2,554,188 | Guanella | | May 22, 1951 |
| 2,616,640 | Bedford et al. | | Nov. 4, 1952 |
| 2,635,185 | Casey | | Apr. 14, 1953 |
| 2,670,454 | Wilson | | Feb. 23, 1954 |
| 2,713,134 | Eckweiler | | July 12, 1955 |
| 2,825,021 | Friend | | Feb. 25, 1958 |
| 2,830,292 | Young | | Apr. 8, 1958 |